3,403,002
RARE EARTH METAL COMPOUNDS AND THEIR
PROCESS OF PREPARATION
Fritz Hulliger, Uerikon, Switzerland, assignor to American Cyanamid Company, Stamford, Conn., a corporation of Maine
No Drawing. Filed Dec. 30, 1963, Ser. No. 334,643
6 Claims. (Cl. 23—204)

ABSTRACT OF THE DISCLOSURE

This invention relates to a novel process for the preparation of rare earth phosphides and arsenides in crystalline form and to the novel crystalline material themselves.

---

This invention relates to a novel process for the preparation of rock salt-type rare earth compounds. More particularly, this invention relates to rare earth metal phosphides and arsenides in crystalline form and to their method of preparation.

Although the rare earth metal arsenides and phosphides hereinafter described are known, they have not been prepared in the crystalline form.

Thus, these compounds have been prepared by sintering techniques or chemical means with the result that the compounds have existed only in powdered form or in the form of porous pellets. Since compositions of matter of this general class in crystalline form traditionally show the highest degree of perfection in that most of the physical properties of such compositions are improved, processes for producing such compositions of matter in crystalline form constitute important technical advances.

The rare earth metal compounds produced in accordance with this invention are characterized by low electrical resistivity and by high thermal stability. Thus, they may be employable in thermoelectric power generation devices for use at elevated temperatures. Such devices and information concerning their construction may be found in the text "Semiconductor Thermoelements and Thermoelectric Cooling," by Ioffe, London, 1957.

The rare earth metal compositions of matter contemplated by this invention are those having the formula $$RX$$

where R is a rare earth element and X is a member selected from the group consisting of phosphorous and arsenic.

The rare earth metals contemplated by this invention are those elements identified as the Lanthanide series, or elements having an atomic number of from 57 through 71. In particular, this invention is concerned with rare earth metal compounds in which the rare earth metal is samarium, gadolinium, terbium, dysprosium, holmium and erbium. Typical phosphides prepared in accordance with the present invention are samarium phosphide, gadolinium phosphide, terbium phosphide, dysprosium phosphide, holmium phosphide and erbium phosphide. Typical arsenides prepared in accordance with the present invention are samarium arsenide, gadolinium arsenide, terbium arsenide, dysprosium arsenide, holmium arsenide and erbium arsenide.

As has been pointed out above, the phosphides and arsenides of this invention are prepared by the process of this invention in crystalline form.

Broadly, this process involves heating the rare earth metal and stoichiometric amount of phophorous or arsenic in a suitable reaction vessel and in the presence of a transport agent under such conditions of temperature that the ultimate compound is transported from the cool to the hot zone of the reaction vessel. This may be accomplished by heating the reactants at a temperature of from 400 to 1000° C. in the presence of a transport agent and collecting the rare earth phosphide or arsenide in crystalline form at the hot zone of the vessel, usually having a temperature of from 950 to about 1200° C.

It is surprising that the rare earth metal compounds of this invention transport so readily, particularly in view of their relation to Group I and II metal compounds, i.e., the alkali or alkaline earth metal compounds, which, insofar as I am aware, have not been the subject of transport reactions.

In practice, I have found that the process of this invention may be carried out readily by heating equimolar amounts of the rare earth metal and either phosphorous or arsenic at moderate temperatures, as for example between 400° C. and about 1000° C. and normally between 700° C. and about 1000° C., and then heating this material under transport reaction conditions with a suitable transport agent such as a halogen, i.e., iodine, bromine and chlorine, and collecting crystals of the rare earth metal compound.

More particularly, equimolar amounts of the rare earth metal and either phosphorous or arsenic are heated in a suitable container, as for example a sealed evacuated quartz glass ampoule, and heated to between 700° C. and 1000° C. Such heating may be carried out over several hours, or even days, as for example two days in the case of the phosphides and something less in the case of the arsenides, as for example a single day. Such heating is carried out for a time sufficient to insure homogenization of the material, which is determined by X-ray. The heating time therefore is determined by the size of the rare earth metal pieces used.

In the next step of the process, this material is placed into a suitable transport reaction vessel containing a transport reaction agent in suitable amount and the reaction vessel sealed.

In this reaction, the substance to be crystallized is confined in what is termed the cool zone of the reaction vessel where the temperature may in fact during the transport reaction be on the order of 700° C. to about 1000° C. Due to the higher stability of the compounds to be formed relative to the halides, and in particular iodides, single crystals of these compounds are deposited on surfaces inside the transport reaction vessel having higher temperatures, as for example temperatures of from 950 to about 1200° C., usually somewhere between the middle and the end of the hot zone of the transport reaction vessel. Usually in the transport reaction from between 3 to 20 mg. of the transport reagent per cubic centimeter of volume of the transport reaction vessel is employed. In order to increase the transportation rate, it is preferred to employ at least 7 mg. of the agent, preferably iodine, per cubic centimeter of reaction vessel volume, though smaller amounts may yield more perfect crystals.

A more detailed discussion regarding transport reaction methods will be found in "Chemische Transport-Reaktionen," Verlag Chemie, Weinheim/Bergstr., 1962 by Harald Schäfer.

As soon as the heating time necessary to insure complete reaction and homogenization of the desired compound is known preferably the two steps are combined, that is to say one will react the elements directly in the transport reaction vessel with the necessary halogen already present. Chlorine may be added in the form of the rare earth chloride plus the equimolar amount of phosphorus or arsenic.

In order to illustrate the present invention, the following examples are given primarily by way of illustration. No specific details or enumerations contained therein should be construed as limiting of the present invention except insofar as they appear in the appended claims. All parts and percentages are by weight unless otherwise specifically designated.

PREPARATION OF THE PHOSPHIDES

Example 1

Samarium phosphide is prepared in the following manner.

.01–.02 mole of coarse powder of samarium and .01–.02 mole of phosphorous, an equimolar amount, were mixed. The samarium was 99+% pure, as was the red phosphorous, a technical grade purified with sodium hydroxide. The mixture is sealed into an evacuated quartz ampoule of about 10 mm. inner diameter and a 1½ mm. wall thickness. The ampoule had a length of about 10 centimeters. This ampoule is placed in a furnace, the temperature of which is slowly raised to from 800 to 1000° C. within two days. This is sufficient to insure the homogeneity of the material. The material resulting from this procedure is gray.

The material is then placed in a transport reaction vessel, in this case a quartz glass ampoule of 25 to 40 mm. inner diameter, 2 mm. wall thickness and about 20 centimeters in length. The ampoule is then evacuated and about 8 mg. of iodine per cubic centimeter of volume of the ampoule are added and then the quartz is sealed off.

The substance is then positioned at one end of the transport reaction vessel, which end is the cool zone, and the vessel is placed into a temperature gradient, as in a bithermal or bisectional furnace, so that the mean temperature as well as the temperature gradient can be varied over a wide range. The same result may in general be achieved with a commercial tube furnace in which the ampoule is placed asymmetrically.

The cool zone is maintained at about 900° C. and single crystals of the samarium phosphide are collected in those portions of the reaction vessel having a higher temperature of about 1050° C.

Example 2

Gadolinium phosphide is prepared in the following manner.

.01–.02 mole of gadolinium powder or crystalline flakes up to 5 mm. in diameter and .01–.02 mole of phosphorous, an equimolar amount, were mixed. The gadolinium was 99+% pure, as was the red phosphorous, a technical grade purified with sodium hydroxide. The mixture is sealed into an evacuated quartz ampoule of about 10 mm. inner diameter and a 1½ mm. wall thickness. The ampoule had a length of about 10 centimeters. This ampoule is placed in a furnace, the temperature of which is slowly raised to 900° C. within two days. This is sufficient to insure the homogeneity of the material. The material resulting from this procedure is brownish.

The material is then placed in a transport reaction vessel, in this case a quartz glass ampoule of 25 to 40 mm. inner diameter, 2 mm. wall thickness and about 20 centimeters in length. The ampoule is then evacuated and 8 mg. of iodine per cubic centimeter of volume of the ampoule are added and then the quartz is sealed off.

The substance is then positioned at one end of the transport reaction vessel, which end is the cool zone, and the vessel is placed into a temperature gradient, as in a bithermal or bisectional furnace, so that the mean temperature as well as the temperature gradient can be varied over a wide range.

The cool zone is maintained at a temperature of 1000° C. and single crystals of the gadolinium phosphide are collected in those portions of the reaction vessel having a higher temperature of 1200° C.

Example 3

Terbium phosphide is prepared in the following manner.

.01–.02 mole of terbium powder and .01–.02 mole of phosphorous, an equimolar amount, were mixed. The terbium was 99+% pure, as was the red phosphorous, a technical grade purified with sodium hydroxide. The mixture is sealed into an evacuated quartz ampoule of about 10 mm. inner diameter and a 1½ mm. wall thickness. The ampoule had a length of about 10 centimeters. This ampoule is placed in a furnace, the temperature of which is slowly raised to 900° C. within two days. This is sufficient to insure the homogeneity of the material.

The material is then placed in a transport reaction vessel, in this case a quartz glass ampoule of 25 to 40 mm. inner diameter, 2 mm. wall thickness and about 20 centimeters in length. The ampoule is then evacuated and 8 mg. of iodine per cubic centimeter of volume of the ampoule are added and then the quartz is sealed off.

The substance is then positioned at one end of the transport reaction vessel, which end is the cool zone, and the vessel is placed into a temperature gradient, as in a bithermal or bisectional furnace, so that the mean temperature as well as the temperature gradient can be varied over a wide range.

The cool zone is maintained at a temperature of 950° C. and single crystals of the terbium phosphide are collected in those portions of the reaction vessel having a higher temperature of 1100° C.

Example 4

Dysprosium phosphide is prepared in the following manner.

.01–.02 mole of dysprosium powder and .01–.02 mole of phosphorous, an equimolar amount, were mixed. The dysprosium was 99+% pure, as was the red phosphorous, a technical grade purified with sodium hydroxide. The mixture is sealed into an evacuated quartz ampoule of about 10 mm. inner diameter and a 1½ mm. wall thickness. The ampoule had a length of about 10 centimeters. This ampoule is placed in a furnace, the temperature of which is slowly raised to 800° C. within two days. This is sufficient to insure the homogeneity of the material.

The material is then placed in a transport reaction vessel, in this case a quartz glass ampoule of 25 to 40 mm. inner diameter, 2 mm. wall thickness and about 20 centimeters in length. The ampoule is then evacuated and 8 mg. of iodine per cubic centimeter of volume of the ampoule are added and then the quartz is sealed off.

The substance is then positioned at one end of the transport reaction vessel, which end is the cool zone, and the vessel is placed into a temperature gradient, as in a bithermal or bisectional furnace, so that the mean temperature as well as the temperature gradient can be varied over a wide range.

The cool zone is maintained at a temperature of 900° C. and single crystals of the dysprosium phosphide are collected in those portions of the reaction vessel having a higher temperature of 1000° C.

Example 5

Holmium phosphide is prepared in the following manner.

.01–.02 mole of holmium powder and .01–.02 mole of phosphorous, an equimolar amount, were mixed. The holmium was 99+% pure, as was the red phosphorous, a technical grade purified with sodium hydroxide. The mixture is sealed into an evacuated quartz ampoule of about 10 mm. inner diameter and a 1½ mm. wall thickness. The ampoule had a length of about 10 centimeters. This ampoule is placed in a furnace, the temperature of which is slowly raised to 800° C. within two days. This is sufficient to insure the homogeneity of the material.

The material is then placed in a transport reaction vessel, in this case a quartz glass ampoule of 25 to 40 mm. inner diameter, 2 mm. wall thickness and about 20 centimeters in length. The ampoule is then evacuated and 8 mg. of iodine per cubic centimeter of volume of the ampoule are added and then the quartz is sealed off.

The substance is then positioned at one end of the transport reaction vessel, which end is the cool zone, and the vessel is placed into a temperature gradient, as in a bithermal or bisectional furnace, so that the mean temperature as well as the temperature gradient can be varied over a wide range.

The cool zone is maintained at a temperature of 950° C. and single crystals of the holmium phosphide are collected in those portions of the reaction vessel having a higher temperature of 1000° C.

Example 6

Erbium phosphide is prepared in the following manner.

.01–.02 mole of erbium powder and .01–.02 mole of phosphorous, an equimolar amount, were mixed. The erbium was 99+% pure, as was the red phosphorous, a technical grade purified with sodium hydroxide. The mixture is sealed into an evacuated quartz ampoule of about 10 mm. inner diameter and a 1½ mm. wall thickness. The ampoule had a length of about 10 centimeters. This ampoule is placed in a furnace, the temperature of which is slowly raised to 900° C. within two days. This is sufficient to insure the homogeneity of the material.

The material is then placed in a transport reaction vessel, in this case a quartz glass ampoule of 25 to 40 mm. inner diameter, 2 mm. wall thickness and about 20 centimeters in length. The ampoule is then evacuated and 8 mg. of iodine per cubic centimeter of volume of the ampoule are added and then the quartz is sealed off.

The substance is then positioned at one end of the transport reaction vessel, which end is the cool zone, and the vessel is placed into a temperature gradient, as in a bithermal or bisectional furnace, so that the mean temperature as well as the temperature gradient can be varied over a wide range.

The cool zone is maintained at a temperature of 1000° C. and single crystals of the erbium phosphide are collected in those portions of the reaction vessel having a higher temperature of 1100° C.

THE RARE EARTH METAL ARSENIDES

Example 7

Samarium arsenide is prepared in the following manner.

.01–.02 mole of samarium powder and .01–.02 mole of arsenic, an equimolar amount, were mixed. The samarium was 99+% pure, as was the arsenic. The mixture is sealed into an evacuated quartz ampoule of about 10 mm. inner diameter and a 1½ mm. wall thickness. The ampoule had a length of about 10 centimeters. This ampoule is placed in a furnace, the temperature of which is slowly raised to 1000° C. within two days. This is sufficient to insure the homogeneity of the material.

The material is then placed in a transport reaction vessel, in this case a quartz glass ampoule of 25 to 40 mm. inner diameter, 2 mm. wall thickness and about 20 centimeters in length. The ampoule is then evacuated and 8 mg. of iodine per cubic centimeter of volume of the ampoule are added and then the quartz is sealed off.

The substance is then positioned at one end of the transport reaction vessel, which end is the cool zone, and the vessel is placed into a temperature gradient, as in a bithermal or bisectional furnace, so that the mean temperature as well as the temperature gradient can be varied over a wide range.

The cool zone is maintained at a temperature of 1120° C. and single crystals of the samarium arsenide are collected in those portions of the reaction vessel having a higher temperature of 1150° C.

Example 8

Gadolinium arsenide is prepared in the following manner.

.01–.02 mole of gadolinium powder and .01–.02 mole of arsenic, an equimolar amount, were mixed. The gadolinium was 99+% pure, as was the arsenic. The mixture is sealed into an evacuated quartz ampoule of about 10 mm. inner diameter and a 1½ mm. wall thickness. The ampoule had a length of about 10 centimeters. This ampoule is placed in a furnace, the temperature of which is slowly raised to 900° C. within two days. This is sufficient to insure the homogeneity of the material.

The material is then placed in a transport reaction vessel, in this case a quartz glass ampoule of 25 to 44 mm. inner diameter, 2 mm. wall thickness and about 20 centimeters in length. The ampoule is then evacuated and about 8 mg. of iodine per cubic centimeter of volume of the ampoule are added and then the quartz is sealed off.

The substance is then positioned at one end of the transport reaction vessel, which end is the cool zone, and the vessel is placed into a temperature gradient, as in a bithermal or bisectional furnace, so that the mean temperature as well as the temperature gradient can be varied over a wide range.

The cool zone is maintained at a temperature of about 950° C. and single crystals of the gadolinium arsenide are collected in those portions of the reaction vessel having a higher temperature of 1150° C.

Example 9

Terbium arsenide is prepared in the following manner.

.01–.02 mole of terbium powder and .01–.02 mole of arsenic, an equimolar amount, were mixed. The terbium was 99+% pure, as was the arsenic. The mixture is sealed into an evacuated quartz ampoule of about 10 mm. inner diameter and a 1½ mm. wall thickness. The ampoule had a length of about 10 centimeters. This ampoule is placed in a furnace, the temperature of which is slowly raised to 900° C. within two days. This is sufficient to insure the homogeneity of the material.

The material is then placed in a transport reaction vessel, in this case a quartz glass ampoule of 25 to 40 mm. inner diameter, 2 mm. wall thickness and about 20 centimeters in length. The ampoule is then evacuated and 8 mg. of iodine per cubic centimeter of volume of the ampoule are added and then the quartz is sealed off.

The substance is then positioned at one end of the transport reaction vessel, which end is the cool zone, and the vessel is placed into the temperature gradient, as in a bithermal or bisectional furnace, so that the mean temperature as well as the temperature gradient can be varied over a wide range.

The cool zone is maintained at a temperature of 950° C. and single crystals of the terbium arsenide are collected in those portions of the reaction vessel having a higher temperature of 1050° C.

Example 10

Dysprosium arsenide is prepared in the following manner.

.01–.02 mole of dysprosium powder and .01–.02 mole of arsenic, an equimolar amount, were mixed. The dysprosium was 99+% pure, as was the arsenic. The mixture is sealed into an evacuated quartz ampoule of about 10 mm. inner diameter and a 1½ mm. wall thickness. The ampoule had a length of about 10 centimeters. This ampoule is placed in a furnace, the temperature of which is slowly raised to 1000° C. within two days. This is sufficient to insure the homogeneity of the material.

The material is then placed in a transport reaction vessel, in this case a quartz glass ampoule of 25 to 40 mm. inner diameter, 2 mm. wall thickness and about 20 centimeters in length. The ampoule is then evacuated and 8 mg. of iodine per cubic centimeter of volume of the ampoule are added and then the quartz is sealed off.

The substance is then positioned at one end of the transport reaction vessel, which end is the cool zone, and the vessel is placed into a temperature gradient, as in a bithermal or bisectional furnace, so that the mean temperature as well as the temperature gradient can be varied over a wide range.

The cool zone is maintained at a temperature of 900° C. and single crystals of the dysprosium arsenide are collected in those portions of the reaction vessel having a higher temperature of 1000° C.

Example 11

Holmium arsenide is prepared in the following manner. .01–.02 mole of holmium powder and .01–.02 mole of arsenic, an equimolar amount, were mixed. The holmium was 99+% pure, as was the arsenic. The mixture is sealed into an evacuated quartz ampoule of about 10 mm. inner diameter, and a 1½ mm. wall thickness. The ampoule had a length of about 10 centimeters. This ampoule is placed in a furnace, the temperature of which is slowly raised to 950° C. within two days. This is sufficient to insure the homogeneity of the material.

The material is then placed in a transport reaction vessel, in this case a quartz glass ampoule of 25 to 40 mm. inner diameter, 2 mm. wall thickness and about 20 centimeters in length. The ampoule is then evacuated and 8 mg. of iodine per cubic centimeter of volume of the ampoule are added and then the quartz is sealed off.

The substance is then positioned at one end of the transport reaction vessel, which end is the cool zone, and the vessel is placed into a temperature gradient, as in a bithermal or bisectional furnace, so that the mean temperature as well as the temperature gradient can be varied over a wide range.

The cool zone is maintained at a temperature of 950° C. and single crystals of the holmium arsenide are collected in those portions of the reaction vessel having a higher temperature of 1100° C.

Example 12

Erbium arsenide is prepared in the following manner. .01–.02 mole of erbium powder and .01–.02 mole of arsenic, an equimolar amount, were mixed. The erbium was 99+% pure, as was the arsenic. The mixture is sealed into an evacuated quartz ampoule of about 10 mm. inner diameter and a 1½ mm. wall thickness. The amopule had a length of about 10 centimeters. This ampoule is placed in a furnace, the temperature of which is slowly raised to 900° C. within two days. This is sufficient to insure the homogeneity of the material.

The material is then placed in a transport reaction vessel, in this case a quartz glass ampoule of 25 to 40 mm. inner diameter, 2 mm. wall thickness and about 20 centimeters in length. The ampoule is then evacuated and 8 mg. of iodine per cubic centimeter of volume of the ampoule are added and then the quartz is sealed off.

The substance is then positioned at one end of the transport reaction vessel, which end is the cool zone, and the vessel is placed into a temperature gradient, as in a bithermal or bisectional furnace, so that the mean temperature as well as the temperature gradient can be varied over a wide range.

The cool zone is maintained at a temperature of 1000° C. and single crystals of the erbium arsenide are collected in those portions of the reaction vessel having a higher temperature of 1050° C.

As has been noted above, the compounds of this invention are crystalline in form and have demonstrated low electrical resistivities and high thermal stabilities, which points up that they may be used in thermoelectric applications, such as power generation or cooling devices.

In connection with the compositions prepared above, their Seebeck coefficients were determined at room temperature by pressing a cold probe and a hot probe on the sample, measuring the resulting voltage and then calibrating against a substance of known thermoelectric power, in this case $SnSe_2$.

The shape of the crystals formed was determined by visual observation. In most cases, the crystals had the shape of octahedra. The largest octahedra edge had an edge length of from 2 to 3 mm. In the smallest crystals produced, a minimum edge length of 1 mm. was obtained. In some instances, these octahedra were intergrown in [100]-direction, thus creating crystals of up to 12 mm. in length. Some phosphides yielded rather long, needle-like crystals grown in the [111]-direction.

These data on the compounds prepared above are recorded in Table I hereinbelow.

TABLE I.—RARE EARTH COMPOUNDS DATA

| Ex. | Composition | $S(\mu v./°C.)$ | Type of conduction | Crystal shape |
|---|---|---|---|---|
| 1 | SmP | ~20 | n-Type | Octahedra. |
| 2 | GdP | ~15 | do | Intergrown octahedra and needles in the [111]-direction. |
| 3 | TbP | | | Octahedra. |
| 4 | DyP | ~10 | n-Type | Needles in the [111]-direction. |
| 5 | HoP | ~15 | do | Long needles in [111]. |
| 6 | ErP | ~4 | do | Needles in [111]. Prismatic Säulen in [100]. |
| 7 | SmAs | ~4 | do | Octahedra. |
| 8 | GdAs | ~7 | p-Type | Do. |
| 9 | TbAs | ~10 | do | Do. |
| 10 | DyAs | ~5 | do | |
| 11 | HoAs | ~10 | n-Type | Intergrown. |
| | | ~15 | p-Type | Octahedra. |
| 12 | ErAs | ~12 | do | Do. |

Since the electrical properties of these compositions of matter may be affected by impurities, raw materials of the highest purity should be employed. Influencing of electric properties may, however, be achieved deliberately in some instances by the inclusion of various doping elements or intended departures from exact stoichiometry.

I claim:

1. A process for preparing compounds in crystalline form having the formula

RX where R is a rare earth metal and X is selected from the group consisting of phosphorous and arsenic, which comprises heating equimolar amounts of R and X at a temperature and for a time to insure homogeneity, cooling the mixture, heating the mixture in the cool zone of a transport reaction vessel in the presence of halogen as a transport agent and collecting crystals of the compounds in the portions of the vessel having a higher temperature than the cool zone.

2. A process for preparing compounds in crystalline form having the formula

RX where R is a rare earth metal and X is selected from the group consisting of phosphorous and arsenic, which comprises heating equimolar amounts of R and X at temperatures up to 1000° C. in a closed vessel for a time sufficient to insure homogeneity, cooling the mixture, heating the mixture at temperatures up to 1000° C. in the cool zone of a transport reaction vessel in the presence of iodine as a transport agent, and collecting crystals of the compounds in the portions of the vessel having a higher temperature than the cool zone said higher temperature being a temperature up to about 1200° C.

3. A process for preparing compounds in crystalline form having the formula

RX where R is selected from the group consisting of Sm, Gd, Tb, Dy, Ho and Er, and X is phosphorous, which comprises heating equimolar amounts of R and X at temperatures up to 1000° C. in a closed vessel for a time sufficient to insure homogeneity, cooling the mixture, heating the mixture at temperatures up to 1000° C. in the cool zone of a transport reaction vessel in the presence of iodine as a transport agent, and collecting crystals of the compounds in the portions of the vessel having a higher temperature than the cool zone.

4. A process for preparing compounds in crystalline form having the formula

RX where R is selected from the group consisting of Sm, Gd, Tb, Dy, Ho and Er, and X is arsenic, which comprises heating equimolar amounts of R and X at temperatures up to 1000° C. in a closed vessel for a time sufficient to insure homogeneity, cooling the mixture, heating the mixture at temperatures up to 1000° C. in the cool zone of a transport reaction vessel in the presence of iodine as a transport agent, and collecting crystals of the compounds in the portions of the vessel having a higher temperature than the cool zone.

5. A process according to claim 4 in which the iodine transport agent is employed in amounts of from about 3 to about 10 milligrams per cubic centimeter of the transport reaction vessel.

6. A process for preparing compounds in crystalline form having the formula

RX where R is a rare earth metal and X is selected from the group consisting of phosphorous and arsenic, which comprises heating equimolar amounts of R and X in one portion of a transport reaction vessel and in the presence of halogen as a transport agent, at a temperature and for a time sufficient to insure reaction and homogeneity, and then transporting the compound and collecting crystals thereof at another portion of the vessel having a higher temperature than that of said first portion of the vessel.

References Cited

UNITED STATES PATENTS 3,087,792   4/1963   Brixner _____ 23—204

OSCAR R. VERTIZ, *Primary Examiner.*

H. S. MILLER, *Assistant Examiner.*